US010073659B2

(12) United States Patent
Alexander et al.

(10) Patent No.: US 10,073,659 B2
(45) Date of Patent: Sep. 11, 2018

(54) POWER MANAGEMENT CIRCUIT WITH PER ACTIVITY WEIGHTING AND MULTIPLE THROTTLE DOWN THRESHOLDS

(71) Applicant: INTEL CORPORATION, Santa Clara, CA (US)

(72) Inventors: James Alexander, Hillsboro, OR (US); Muthukumar P. Swaminathan, Folsom, CA (US); Richard P. Mangold, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 79 days.

(21) Appl. No.: 14/751,846

(22) Filed: Jun. 26, 2015

(65) Prior Publication Data

US 2016/0378172 A1    Dec. 29, 2016

(51) Int. Cl.
*G06F 1/26* (2006.01)
*G06F 1/32* (2006.01)
*G06F 3/06* (2006.01)
*G06F 9/50* (2006.01)

(52) U.S. Cl.
CPC .......... *G06F 3/0673* (2013.01); *G06F 1/3206* (2013.01); *G06F 1/329* (2013.01); *G06F 1/3228* (2013.01); *G06F 1/3243* (2013.01); *G06F 3/0625* (2013.01); *G06F 3/0653* (2013.01); *G06F 9/5094* (2013.01); *Y02D 10/152* (2018.01); *Y02D 10/24* (2018.01)

(58) Field of Classification Search
CPC ........ G06F 1/3296; G06F 1/28; G06F 3/0625; G06F 3/0653; G06F 3/0673

USPC ......................................................... 713/300
See application file for complete search history.

(56) References Cited

U.S. PATENT DOCUMENTS

| 5,752,050 | A | 5/1998 | Hernandez et al. |
| 5,912,839 | A | 6/1999 | Dvshinsky et al. |
| 6,470,238 | B1 * | 10/2002 | Nizar ................ G06F 13/1668 700/153 |
| 7,362,705 | B2 | 4/2008 | Beukema et al. |
| 7,590,918 | B2 | 9/2009 | Parkinson |

(Continued)

OTHER PUBLICATIONS

Lee et al., "Architecting Phase Change Memory as a Scalable DRAM Alternative", ISCA '09, Jun. 20, 2009, 12 pgs., Austin, Texas, USA.

(Continued)

*Primary Examiner* — Nitin Patel
(74) *Attorney, Agent, or Firm* — Compass IP Law, PC

(57) ABSTRACT

A method is described. The method includes receiving an indication of an activity of load circuitry of a power supply. The method includes, in response to the indication, generating a first signal that describes the activity and a second signal that describes whether the event is initiating or completing. The method includes determining a weight amount from the first signal and adjusting a credit count by the weight amount up or down based on the second signal. The method includes comparing the credit count against a first threshold. The method includes calculating an average credit count that accounts for the credit count and previous credit counts and comparing the average credit count against a second threshold. The method includes adjusting an activity level of the load circuitry if either threshold is crossed.

20 Claims, 6 Drawing Sheets

(56) References Cited

U.S. PATENT DOCUMENTS

| | | | |
|---|---|---|---|
| 7,600,078 B1 | 10/2009 | Cen et al. | |
| 7,756,053 B2 | 7/2010 | Thomas et al. | |
| 7,913,147 B2 | 3/2011 | Swaminathan et al. | |
| 8,051,253 B2 | 11/2011 | Okin et al. | |
| 8,055,922 B2 | 11/2011 | Brittain et al. | |
| 8,190,930 B2* | 5/2012 | Herdrich | G06F 1/3203 710/113 |
| 8,327,168 B2 | 12/2012 | Winick et al. | |
| 8,462,537 B2 | 6/2013 | Karpov et al. | |
| 8,462,577 B2 | 6/2013 | Zeng et al. | |
| 8,463,948 B1 | 6/2013 | Qawami et al. | |
| 8,612,676 B2 | 6/2013 | Dahlen et al. | |
| 8,549,329 B2 | 10/2013 | Mundada et al. | |
| 8,605,531 B2 | 12/2013 | Kau et al. | |
| 8,607,089 B2 | 12/2013 | Qawami et al. | |
| 8,612,809 B2 | 12/2013 | Casper et al. | |
| 8,649,212 B2 | 2/2014 | Kau et al. | |
| 8,719,606 B2 | 5/2014 | Lam et al. | |
| 8,838,935 B2 | 9/2014 | Hinton | |
| 8,935,578 B2 | 1/2015 | Alexander et al. | |
| 9,298,606 B2 | 3/2016 | Ramanujan | |
| 9,317,429 B2 | 4/2016 | Ramanujan et al. | |
| 9,342,453 B2 | 5/2016 | Nale et al. | |
| 9,378,133 B2 | 6/2016 | Nachimuthu et al. | |
| 9,417,684 B2 | 8/2016 | Ramage et al. | |
| 9,430,372 B2 | 8/2016 | Nachimuthu et al. | |
| 9,568,978 B2 | 2/2017 | Burns et al. | |
| 9,588,823 B2 | 3/2017 | Rajappa et al. | |
| 2003/0125900 A1 | 7/2003 | Orenstien et al. | |
| 2005/0254519 A1 | 11/2005 | Beukema et al. | |
| 2006/0090086 A1 | 4/2006 | Rotem et al. | |
| 2006/0248355 A1 | 11/2006 | Thayer et al. | |
| 2007/0002988 A1* | 1/2007 | Kim | G11C 7/1051 375/354 |
| 2007/0005922 A1 | 1/2007 | Swaminathan et al. | |
| 2007/0030030 A1* | 2/2007 | Waldrop | G11C 7/1045 326/93 |
| 2008/0016269 A1 | 1/2008 | Chow et al. | |
| 2008/0034148 A1 | 2/2008 | Gower | |
| 2008/0082844 A1 | 4/2008 | Ghiasi et al. | |
| 2008/0270811 A1 | 10/2008 | Chow et al. | |
| 2008/0320323 A1 | 12/2008 | Brittain et al. | |
| 2009/0138219 A1 | 5/2009 | Bletsch et al. | |
| 2009/0138733 A1 | 5/2009 | Winick et al. | |
| 2009/0313416 A1 | 12/2009 | Nation | |
| 2010/0050008 A1 | 2/2010 | Allalouf et al. | |
| 2010/0110748 A1 | 5/2010 | Best | |
| 2010/0131827 A1 | 5/2010 | Sokolov | |
| 2010/0169690 A1 | 7/2010 | Mundada et al. | |
| 2010/0291867 A1 | 11/2010 | Abdulla et al. | |
| 2010/0293317 A1 | 11/2010 | Confalonieri et al. | |
| 2010/0306446 A1 | 12/2010 | Villa et al. | |
| 2010/0306453 A1 | 12/2010 | Doller | |
| 2010/0318718 A1 | 12/2010 | Eilert et al. | |
| 2011/0060927 A1* | 3/2011 | Fillingim | G11C 5/141 713/320 |
| 2011/0122691 A1* | 5/2011 | Sprouse | G06F 1/28 365/185.03 |
| 2011/0153916 A1 | 6/2011 | Chinnaswamy et al. | |
| 2011/0208900 A1 | 8/2011 | Schuette et al. | |
| 2011/0291884 A1 | 12/2011 | Oh et al. | |
| 2011/0320150 A1 | 12/2011 | David et al. | |
| 2012/0260117 A1* | 10/2012 | Acar | G06F 1/3243 713/340 |
| 2012/0331207 A1* | 12/2012 | Lassa | G06F 1/3278 711/103 |
| 2013/0268728 A1 | 10/2013 | Ramanujan et al. | |
| 2013/0275661 A1 | 10/2013 | Zimmer et al. | |
| 2013/0290597 A1 | 10/2013 | Faber | |
| 2014/0003145 A1 | 1/2014 | Akers et al. | |
| 2014/0129767 A1 | 5/2014 | Ramanujan et al. | |
| 2014/0297938 A1 | 10/2014 | Puthiyedath et al. | |
| 2014/0359196 A1 | 12/2014 | Ragland et al. | |
| 2015/0033045 A1* | 1/2015 | Raghuvanshi | G06F 1/3234 713/320 |
| 2016/0054774 A1 | 2/2016 | Song et al. | |
| 2016/0054780 A1 | 2/2016 | Bodas et al. | |
| 2016/0054781 A1 | 2/2016 | Rajappa et al. | |
| 2016/0054783 A1 | 2/2016 | Rajappa et al. | |

OTHER PUBLICATIONS

Condit et al., "Better I/O Through Byte-Addressable, Persistent Memory", SOSP '09, Oct. 11, 2009, pp. 133-146. Big Sky, Montana, USA.

Freitas et al., "Storage-class memory: The next storage system technology", IBM J. Res. & Dev., Jul./Sep. 2008, pp. 439-447, vol. 52, No. 4/5.

Akel et al., "Onyx: A Prototype Phase Change Memory Storage Array",www.flashmemorysummit.com/.../Proceeding_2011/08/11_S301_Akel.pdf, 5 pgs.

Mearian, "IBM announces computer memory breakthrough Phase-change memory offers 100 times the write performance of NAND flash", Jun. 30, 2011, 3 pgs.

Caulfield et al., "Moneta: A High-performance Storage Array Architecture for Next-generation, Non-volatile Memories", MICRO 43: Proceedings of the 43rd Annual IEEE/ACM International Symposium on Microarchitecture, Atlanta, GA Dec. 2010 pp. 385-395.

"The Non-Volatile Systems Laboratory Coding for non-volatile memories", http://nvsl.ucsd.edu/ecc, printed Sep. 1, 2011. 2 pgs.

"The Non-Volatile Systems Laboratory Moneta and Onyx: Very Fast SS", http://nvsl.ucsd.edu/moneta/, 3 pgs., Sep. 1, 2011.

"The Non-Volatile Systems Laboratory NV-Heaps: Fast and Safe Persistent Objects", http://nvsl.ucsd.edu/nvuheaps/, 2 pgs., Sep. 1, 2011.

"Phase change memory-based 'moneta' system points to the future of computer storage", ScienceBlog, Jun. 2, 2011, 7 pgs.

Duereshi et al., "Scalable High Performance Main Memory System Using Phase-Change Memory Technology", ISCA '09, Jun. 20, 2009, 10 pgs., Austin, Texas, USA.

Kant, Dr. Krishna, "Exploiting NVRAM for Building Multi-Level Memory Systems", International Workshop on Operating System Technologies for Large Scale NVRAM, Oct. 21, 2008, Jeju, Korea, 19 pages.

Bailey et al., "Operating System Implications of Fast, Cheap, Non-Volatile Memory" 13th USENIX, HOTOS11 2011, May 9-11, 2011, 5 pgs.

Raoux et al., "Phase-change random access memory: A scalable technology", IBM J. Res. & Dev., Jul./ Sep. 2008, pp. 465-479, vol. 52, No. 4/5.

Chen et al., "Rethinking Database Algorithms for Phase Change Memory", 5th Biennial Conference on Innovative Data Systems Research (CIDR '11), Jan. 9, 2011, 11 pgs., Asilomar, California, USA.

Jacob et al., "The Memory System You Can't Avoid It, You Can't Ignore It, You Can't Fake It", 2009, 77 pgs., Morgan & Claypool.

Mogul et al., "Operating System Support for NVM+DRAM Hybrid Main Memory", 12th Workshop on Hot Topics in Operating Systems (HatOS XII), May 18, 2009, 9 pgs.

Wu, et al., "eNVy: A Non-Volatile, Main Memory Storage System" 1994 ACM., ASPLOS VI. pp. 86-97.

Dhiman, et al. "PDRAM: A Hybrid PRAM and DRAM Main Memory System", Jul. 26, 2009, Department of Computer Science and Engineering, 6 pages.

The International Search Report and Written Opinion in related PCT/US2016/034071, dated Aug. 16, 2016, 11 pages.

* cited by examiner

POWER MANAGEMENT CIRCUIT WITH PER ACTIVITY WEIGHTING AND MULTIPLE THROTTLE DOWN THRESHOLDS

FIELD OF INVENTION

The field of invention pertains generally to a power management circuit with per activity weighting and multiple throttle down thresholds.

BACKGROUND

Power consumption has become one of the more critical parameters that a circuit is judged by. Here, with increasingly smaller feature sizes and increasingly faster clock speeds, semiconductor chip designers are faced with the challenge of efficiently designing extremely large numbers of faster devices into a commercially viable integrated circuit. Present day circuit designers are therefore very much focused on producing circuits that can extract the performance potential of the underlying manufacturing technology, while, at the same time, keeping operation of the overall circuit within a reasonable power budget.

FIGURES

A better understanding of the present invention can be obtained from the following detailed description in conjunction with the following drawings, in which.

DETAILED DESCRIPTION

Figure 1:
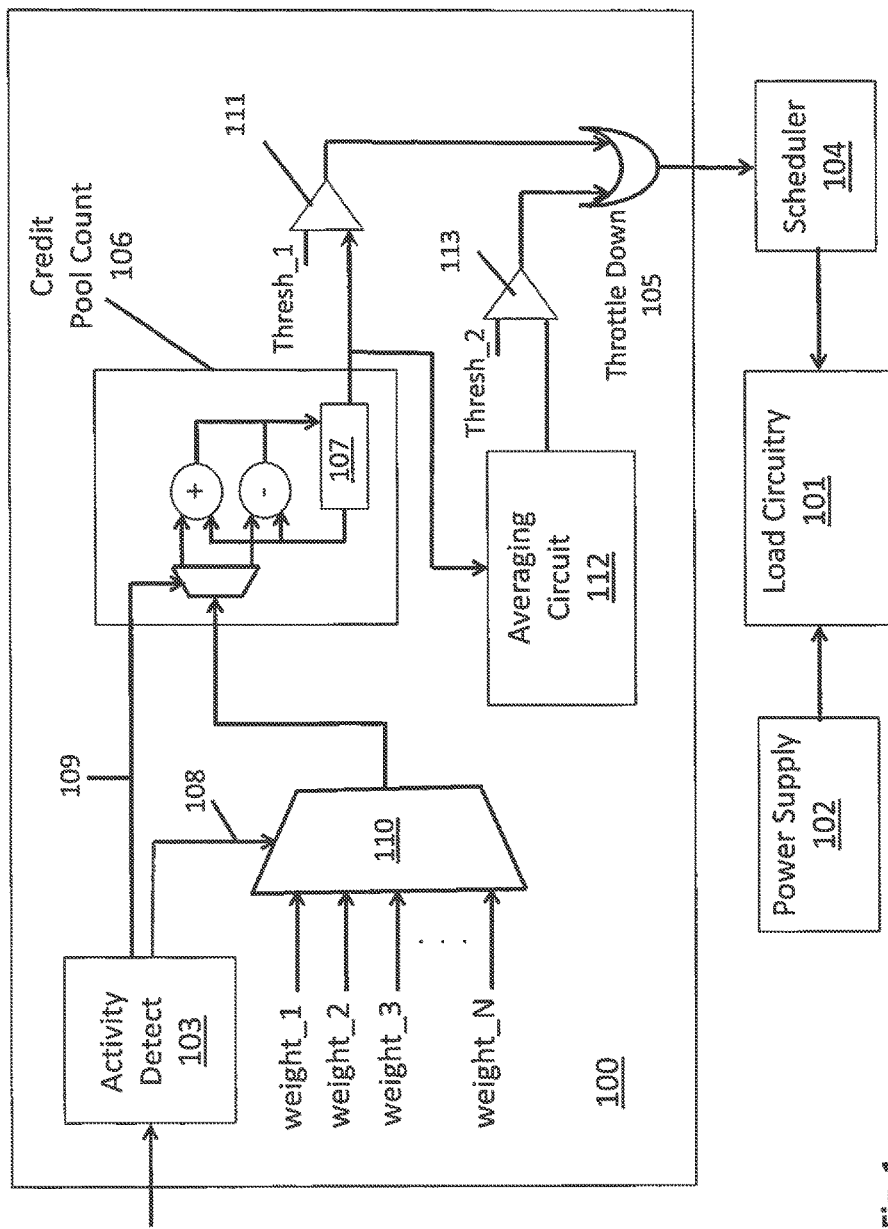
FIG. 1 shows an embodiment of a power management circuit.

FIG. 1 shows a design for a power management circuit 100 that measures both the instantaneous power currently being consumed by a load circuit 101 and the average power that has been consumed by the load circuit 101 over a preceding time window. By measuring both types of power consumption, different triggers can be set to throttle back the power consumption of the load circuit 101, e.g., by commanding the load circuit 101 to be less active. More specifically, the power consumption of the load circuit 101 can be throttled down in response to either: 1) its instantaneous power exceeding a maximum level ("absolute" power limit of the power supply 102); or, 2) its average power exceeding a maximum level ("sustainable" power limit of the power supply 102).

In various instances, the power supply 102 may have sufficient resources to briefly provide an amount of power that exceeds its sustainable power limit. Here, sustainable power is understood to be a rating that characterizes a power supply's ability to continuously maintain an amount of delivered power. Deviations about this sustainable level are generally permissible. In the case of power draw deviations below the sustainable level, the power supply is operating well within its capabilities.

Power draw deviations above the sustainable level are also generally permissible provided they are brief. For instance, as a simplistic example, if a power supply has a sustainable power level of 12W, it would be permissible to briefly draw 13W from the power supply provided the drawn power drops thereafter so that the average power drawn over some time period falls to a level within the sustainable level of 12W. In this case, the sustainable power level is not really offended because the time over which the average power is calculated includes the lower power draw time period. Thus, the circuit 101 that is supplied by the power supply 102 can enjoy a "turbo" mode in which it is permitted to briefly perform at a level that it can not operate at for long periods of time.

A related scenario occurs in the case of regular but temporally separated runtime power draw "bursts". An example is a DIMM card having multiple memory devices and an interface to a high speed memory bus where, over the course of an extended runtime, there will be low power reads/writes from/to the memory devices for extended periods of time interspaced in time by high power bus transactions for much shorter periods of time. Here, the longer low power reads/writes may lower the average power delivered to the DIMM card to a level that permits the shorter high power bus transactions to briefly exceed the sustainable power rating of the power supply. As such, the bus driver circuits that interface to the memory bus and the memory devices may share the same power supply (that is, both circuits can be viewed as part of the load).

Allowing power draw to reach an instantaneous power limit provided an average power limit is not offended also provides for more efficient usage of the power budget that exists between the instantaneous power limit and the average power limit. That is, drawn power can remain at or near the instantaneous power level up and until the average power maximum rating is offended. Thus, using the above mentioned DIMM card example, some implementations (e.g., depending on power supply capacity and load) may have enough time to permit back-to-back high power bus transactions before offending the average power rating.

The power management circuit 100 of FIG. 1 includes an activity detection circuit 103 that detects the various requests or other activities that the load circuitry 101 is expected to handle. A scheduler 104 schedules these activities. The decisions made by the scheduler 104 essentially determine how much power the load circuitry 101 will consume. For example, by inserting idles into the load circuitry's schedule the power consumption of the load circuitry 101 will be reduced. Likewise, by inserting higher power operations closer to one another in time the power consumption of the load circuitry 101 will be increased. Depending on implementation, some, all or none of the power management circuit 100 and/or scheduler circuit 104 may be part of the load 101.

The scheduler 104 reacts to a throttle down signal 105 provided by the power management circuitry. In response to the throttle down signal 105, the scheduler 104 will insert lesser power consuming activities into the scheduler (e.g., idles or other low power tasks) and/or spread out activities to be performed farther apart in time.

The power management circuitry includes a credit pool count circuit 106. The credit pool count circuit 106 includes a register 107 or other circuit capable of holding state information. Here, register 107 holds a credit count where the total number of credits is correlated with the amount of power that the power supply can deliver. As the load circuitry 101 consumes more power, the credit count drops which, in turn, reflects the reduced capacity of the power supply to deliver additional power.

As mentioned above, the activity detection circuit 103 receives indications of what activities the load circuitry 101 will perform. The scheduler 104 subsequently schedules these activities. The activity detector 103 provides a first output 108 that indicates what type of new activity has just been detected. This output 108 is provided to a multiplexer 110 which selects one of a plurality of weights, where, the selected weight is associated with the specific new activity that has just been detected.

Here, the load circuitry 101 is assumed to be designed to perform a number of different activities where each activity has a different amount of associated power consumption. For example, again referring to the DIMM card example above, reads and/or writes consume less power than memory bus transactions. As such, reads and/or writes will have associated weights that are less than the weight associated with a memory bus transaction. A weight is a numerical value that may be stored into a register or other circuit capable of holding state information (e.g., a read only memory). Reads may also have different weights than writes depending on the technology of the memory devices. More details concerning specific embodiments in this regard are discussed further below.

When a specific new activity event is therefore detected, a numerical value corresponding to its power consumption (its weight) is selected by the multiplexer 110 and forwarded to the credit pool count circuit 106. The value of the weight is then subtracted or added to the credit count depending on whether the new activity event corresponds to the initiation of the activity or the completion of the activity. For example, in the case of a memory bus transaction that is newly being requested from a host, the weight for the transaction will be subtracted from the credit count because the transaction has yet to happen. By contrast, in the case of a memory bus transaction that has just been completed, the value of the weight will be added to the credit count because the transaction has already occurred. Thus, decrements from the credit count correspond to power consumption yet to happen and increments to the credit count correspond to the additional power budget that is freed up after an activity completes (alternative embodiments may choose to implement an opposite approach where completions detract and new events increment up).

The activity event detection circuit 103 therefore also presents a second output 109 that indicates whether the new event corresponds to a new request for a new activity or notice that an older activity has completed. Thus output 109 determines whether the weight for the activity is processed by an additive channel or a subtractive channel within the credit pool count circuit 106. In the case of the additive channel, the weight is added to the current credit count value and the new credit count value is stored in register 107. In the case of the subtractive channel, the weight is subtracted from the current credit count value and the new credit count value is stored in register 107.

The current credit count value with register 107, which again corresponds to how much capacity the power supply has left to supply additional power, is provided to a first threshold detector 111 and an averaging circuit 112 with second threshold detector 113. The first threshold circuit 111 is used to prevent violations of the power supply's instantaneous power rating. Here, a first threshold value Thresh_1 corresponds to a very low credit count value that is representative of very little additional power left in the power supply (if any). If the current credit count falls below the first threshold, comparator 111 will trip and a throttle down signal will be raised to the scheduler 104.

The averaging circuit 112 effectively averages the current credit count value with previous credit count values over a window of time in order to calculate an average power consumption for the load 101 that is supplied by the power supply 102. The average power consumption is then provided to a second threshold detection circuit 113 that is used to prevent violations of the power supply's sustained power rating. Here, a second threshold value Thresh_2 corresponds to a credit count that is higher than the first threshold value (there is more power budget beyond the sustainable power rating than beyond the instantaneous power rating). However if the output of the averaging circuit 112 falls below the second threshold, the second comparator 113 will trip which will also raise a throttle down signal to the scheduler.

Figure 2:
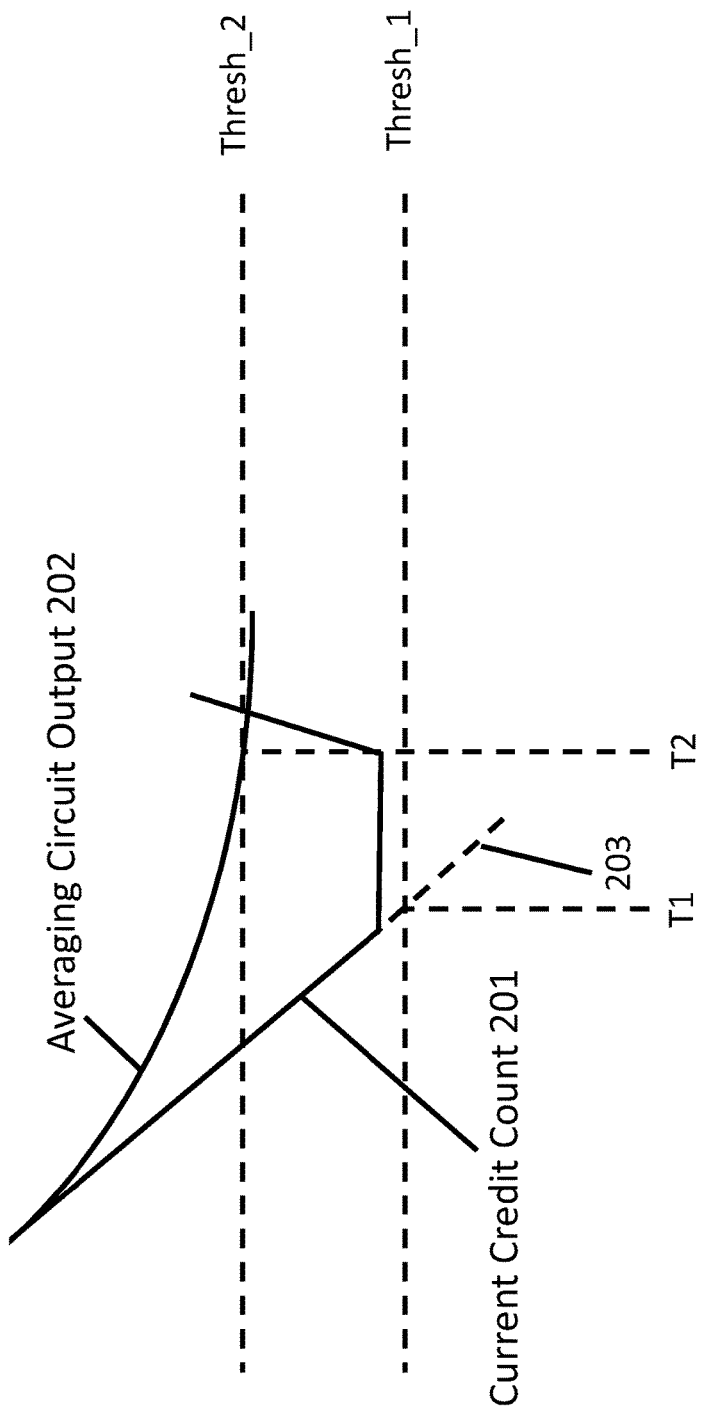
FIG. 2 shows an embodiment of operation of the power management circuit of FIG. 1.

FIG. 2 schematically shows an example of the behavior of the credit count 201 and the threshold comparators in response to a sustained activity level of the load circuit that is being supplied by the power supply without a corresponding completion of such activities. In the face of a stream of new activities without the completion of any of the same, the credit count 201 will steadily diminish over time. Likewise, the average credit count 202 will also diminish over time but at a slower rate because the average will be continually calculated within a window that includes higher credit values than the current credit count value.

The first threshold level (instantaneous power consumption) Thresh_1 corresponds to a lower threshold than the second threshold level (sustained power consumption) Thresh_2. The first threshold level Thresh_1 is compared against the current credit count 201 but not the average credit count 202. Likewise, the second threshold Thresh_2 is compared against the average credit count 202 but not the current credit count 201.

As observed in FIG. 2, the activity level of the load continues to increase until the credit count 201 reaches a level that is just shy of the first threshold level Thresh_1. Thereafter, the activity level of the circuit remains constant (e.g., the power draw from new activities is canceled out by the completion of older activities). As such, the instantaneous power consumption rating of the circuit is never offended (the first threshold Thresh_1 is not crossed). If the activity level of the load did not level off and instead followed along trajectory 203, the first threshold would have tripped at time T1.

However, because the activity level of the circuit is elevated (it remains constant just shy of the instantaneous threshold), the average credit count 202 will continue to fall (albeit at a slower rate once the activity level stops increasing). Eventually, at time T2, the average credit count 202 crosses the second threshold Thresh_2 which trips the second comparator and raises a throttle down signal to the scheduler. In response to the throttle down signal, the scheduler reduces the new activity level of the circuit (e.g., by inserting idles) which, e.g., will have the affect of accumulating completions of older activities without adding new ones, which adds to the current credit count. As such the current credit count begins to rise after time T2.

The higher credit count will eventually cause the average 202 to cross back over the second threshold level Thresh_2 (not shown). In response, the throttle down signal will no longer be raised. In various embodiments there may be some hysteresis circuitry applied at the throttle signal output to cause the throttle down signal to be released after the average credit count has risen above the second threshold by some margin to prevent thrashing of the throttle down signal. Such hysteresis may alternatively or in combination be integrated into the scheduler (e.g., the scheduler "back off" new activities for an extended period of time to ensure the credit count will rise above the second threshold with sufficient margin). Similar and/or same principles may also be applied with respect to the first threshold Thresh_1 and the current credit count.

Figure 3:
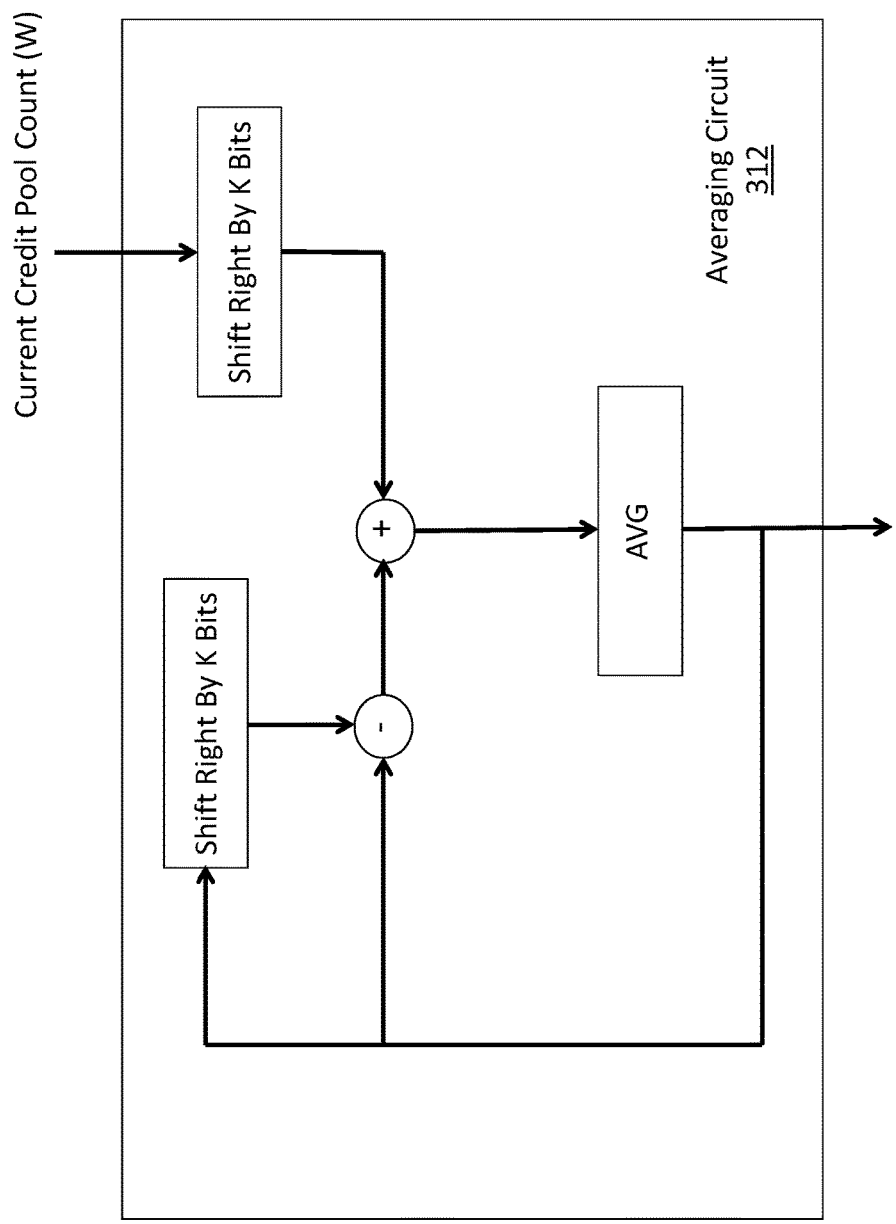
FIG. 3 shows an embodiment of a averaging circuit.

FIG. 3 shows an embodiment 312 of the averaging circuit. In the averaging circuit embodiment 312 of FIG. 3, the averaging function is implemented as a discrete filter that operates on a stream of values that are representative of the instantaneous power. In particular, the low pass filter is mathematically represented as:

$$P(n+1)=P(n)-(P(n)/2^K)+(W/2^K) \qquad \text{Eqn. 1}$$

where $P(n+1)$ is the average output for the next clock cycle, $P(n)$ is the average output of the current clock cycle, W is the current clock cycle's instantaneous power and K is a value that establishes the bandwidth of the filter which can also be viewed as the size of the time window over which the average averages. Generally, as K increases, the size of the time window narrows and the averaging circuit output will more rapidly adjust to a change in instantaneous power. Contra-wise, as K decreases, the size of the time window increases and the averaging circuit output will less rapidly adjust to a change in instantaneous power.

In various embodiments, K is determined empirically based on the observed performance of a specific environment and/or some understanding of the overall environment. Generally, however, K should be chosen to "tune" the output of the averaging circuit to the actual capabilities of the power supply. Here, the greater the amount of time that the power supply can sustain operation near the instantaneous power limit, the smaller K can be. Contra-wise, the smaller the amount of time that the power supply can sustain operation near the instantaneous power limit, the higher K should be. The former will trip the averaging threshold later, the later will trip the averaging threshold sooner. In an embodiment, a register is used to hold the averaging circuit output value. A pair of shift registers are used to implement the $\frac{1}{2}^K$ terms by shifting their respective operands ($P(n)$ and W) to the right by K bits. K may be programed into the circuit by being kept in a software/firmware writable register that is coupled to both shift registers.

In further or alternative embodiments, the specific tuning of the output of the averaging circuit is designed to match the "$3^{rd}$ droop" of the power supply to a sudden surge in current draw (such as might result from the sudden enablement of a master clock of the load circuit). The 3rd droop is essentially a form of time constant that characterizes the response dynamics of the power supply.

Figure 4:
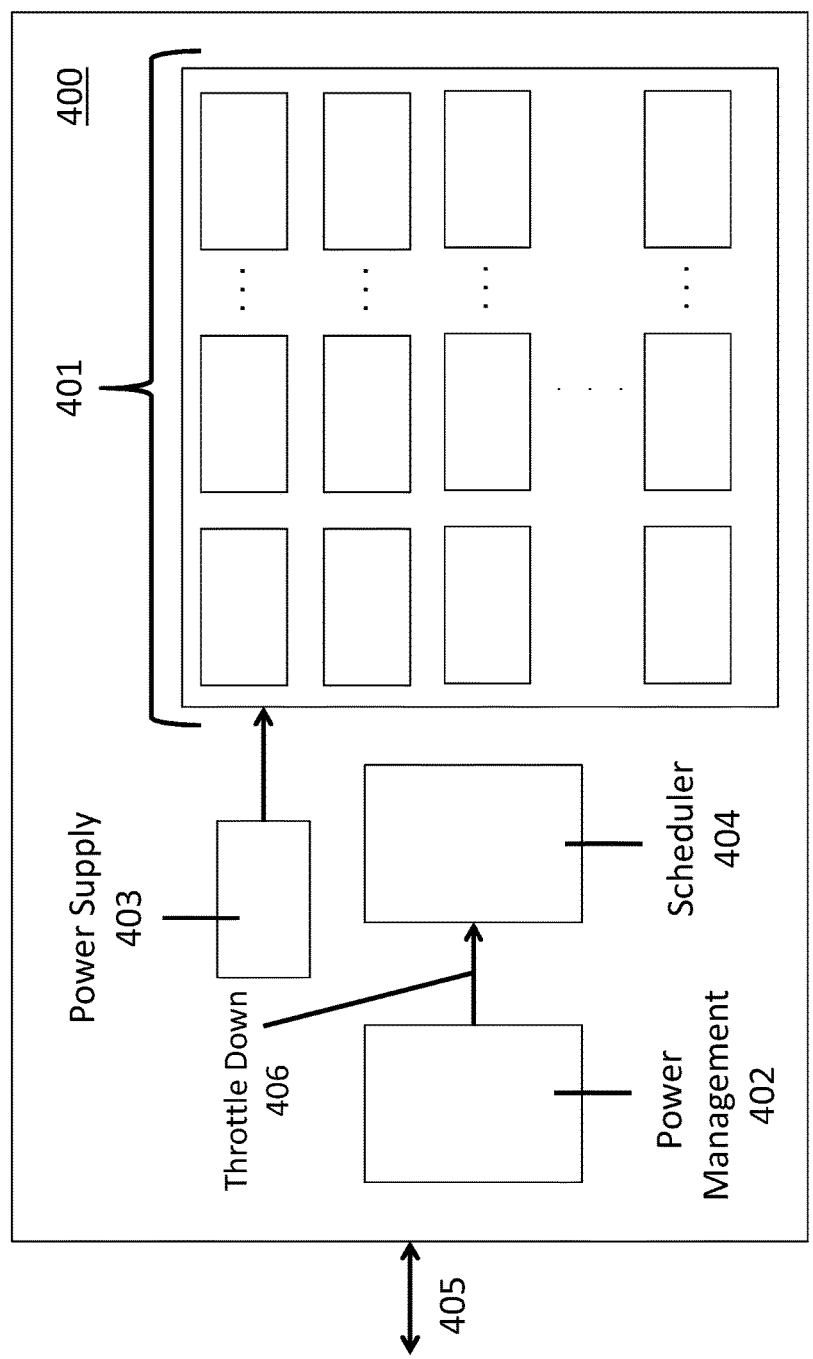
FIG. 4 shows an embodiment of a DIMM card.

FIG. 4 shows a more specific embodiment to which the power management circuitry described above can be applied. FIG. 4 shows a dual in-line memory module (DIMM) 400 having a plurality of memory chips 401 which may be used, e.g., as system memory chips. System memory or main memory is the memory of a computing system that software operates directly out of. As is understood in the art, processors or processing cores have internal register space in which to hold instructions and data of the software routines being executed. The amount of register space is not infinite however and frequently system memory is invoked to read or write instructions or data of the executing software routines.

The DIMM card 401 of FIG. 4 may be implemented in various embodiments in a computing system having a multi-leveled system memory. A multi-leveled system memory is a memory with more than one distinct architectural level of different performance capabilities. For example, a lower second layer may be implemented with slower speed but higher density emerging system memory technology (discussed in more detail further below) and a higher first layer may be implemented with faster but less dense DRAM memory. The first layer may act as a cache for the lower second layer, or, may have its own system memory address space that is different than the system memory address space allocated to the second layer.

The DIMM 401 also includes a power management circuit 402 and power supply 403. The power supply 403 provides power to the memory chips 401. The activity of the memory chips is managed by a scheduler circuit 404 that is also on the DIMM. In various embodiments, the scheduler 404 determines when read and/or write requests are actually applied to the memory devices 401 and/or when responses to requests are provided on a memory bus 405. The power management circuit 402 provides throttle down signals 406 to the scheduler 404 consistent with the preceding discussions.

In various embodiments, transactions on the memory bus 405 to which the DIMM is connected are given a higher weight by the power management circuitry 402 than reads or writes from/to the memory devices 401. Further still, the memory bus transaction weights include a read or write weight and an on die termination weight. The later weight is added to any read or write weight when a memory bus transaction (read or write) occurs with on die termination enabled. Of course, the above is just one embodiment based on a particular type of memory bus and memory technology. Other embodiments and/or implementations may include low power memory bus transactions and high power memory reads and/or writes. In these embodiments, the weight for a read/write may be higher than the weight for a bus transaction.

In various embodiments, some or all of the memory devices 401 may be implemented with an emerging system memory technology such as a three dimensional cross-point memory technology (non volatile or otherwise). Three dimensional means the storage cells are arranged in three dimensions (e.g., in multiple stacked layers) rather than just along a plane (e.g., along a semiconductor substrate surface as with traditional DRAM or SRAM memory). Cross-point corresponds to an architecture in which storage cell locations are defined by overlapping wiring regions. Examples of such memory technologies include, to name a few possibilities, a phase change based memory (e.g., SXP or PCMS), a ferro-electric based memory (e.g., FRAM), a magnetic based memory (e.g., MRAM), a spin transfer torque based memory (e.g., STT-RAM), a resistor based memory (e.g., ReRAM) or a "Memristor" based memory. Cross-point memories may be byte addressable (e.g., if implemented as main memory of a computing system).

In various embodiments, the power management circuit 402 uses different weights for write operations and read operations. For example, in the case of phase change memories, more power is consumed by a write operation (e.g., because the storage cell media is heated) than a read operation (e.g., which does not heat the storage cell media). Additionally, there may be different types of writes (e.g., a nominal write, a refresh write, etc.). As such, depending on the write activity that is actually applied to the memory device, a different weight will be triggered to/from the credit pool by the power management circuit 402.

Further still, in yet other embodiments, different memory technology types may exist on a same DIMM. For example, two different types of emerging memory technology, or, emerging memory technology devices and DRAM devices may be resident on a same DIMM. The different memory technologies may have their own associated weights that are different from one another and that are accounted for in the design of the power management circuit 402. For example, a DRAM device may have its own weight for a read that is different than a phase change memory read where both DRAM and phase change memory are resident on a same DIMM and the power management circuit 402 incorporates both read weights. Likewise the DRAM may have its own associated write weight that is different than any of the phase change write weights.

Note also that the power management circuit 402 can be used to implement terms of service. For example, a customer may only pay for a certain amount of "performance" of a given circuit (memory DIMM or otherwise). The amount of service is reflected in the number of credits that are programmed into the credit pool with a lesser amount of performance/service corresponding to fewer credits and a greater amount of performance/service corresponding to a greater number of credits. The natural operation of the power management circuit will throttle the scheduler to schedule tasks consistently with the agreed to performance/service. The credit pool can be made programmable by coupling register 107 of FIG. 1 to a software/firmware register or implementing register 107 as a software/firmware visible register.

Although the above embodiments have been described in relation to a scheduler as the recipient of the throttle output of the power management circuit, note that a multitude of embodiments may contemplate another type of circuit other than a scheduler that has some impact on the amount of work done by a power supply's load. Examples include a circuit that issues instructions for execution, a circuit that sends traffic into a network, and a circuit that triggers execution of an application specific task (as opposed to execution of a program code instruction).

Although the above embodiments have been described in relation to a throttle down signal, more generally, the above teachings can also be applied to generate a throttle up signal. For example, in embodiments where higher credit counts correspond to more available power, instantaneous and/or averaging threshold circuits like those discussed above may be implemented that trigger with rising rather than falling credit count. Such a throttle up signal may trigger the load device to become more active if sufficient room in the power budget exists as exemplified by a higher credit count value. Such throttle up threshold circuitry (e.g., an instantaneous credit count throttle up threshold and/or an average credit count throttle up threshold circuit) may exist with or without the aforementioned throttle down threshold circuits.

Figure 5:
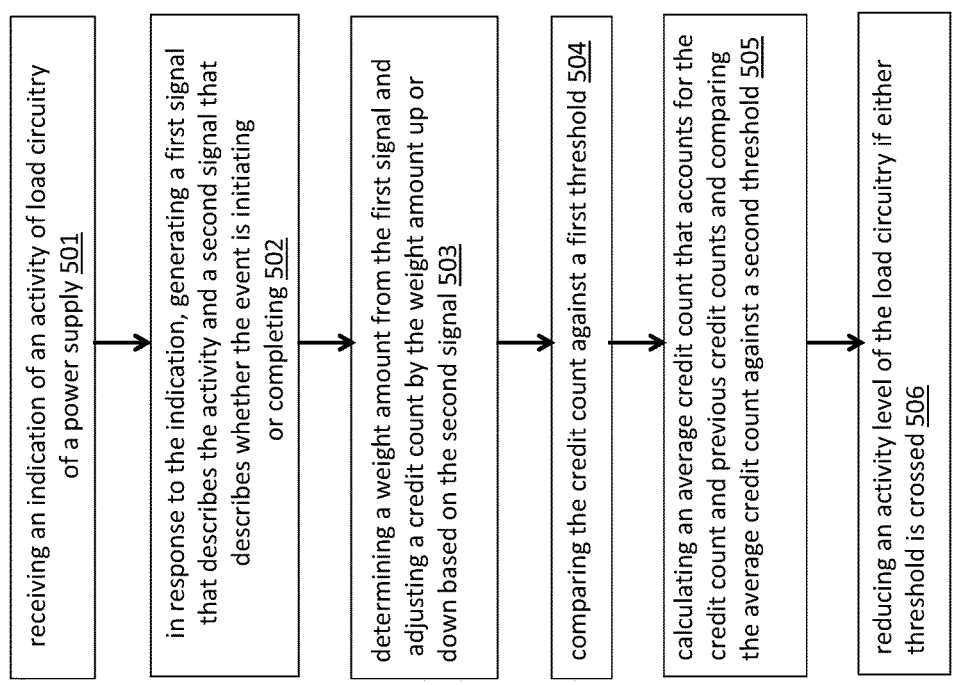
FIG. 5 shows an embodiment of a method performed by the power management circuit of FIG. 1.

FIG. 5 shows an embodiment of a methodology performed by circuitry described herein. The method includes receiving an indication of an activity of load circuitry of a power supply 501. The method includes, in response to the indication, generating a first signal that describes the activity and a second signal that describes whether the event is initiating or completing 502. The method includes determining a weight amount from the first signal and adjusting a credit count by the weight amount up or down based on the second signal 503. The method includes comparing the credit count against a first threshold 504. The method includes calculating an average credit count that accounts for the credit count and previous credit counts and comparing the average credit count against a second threshold 505. The method includes reducing an activity level of the load circuitry if either threshold is crossed 506.

Figure 6:
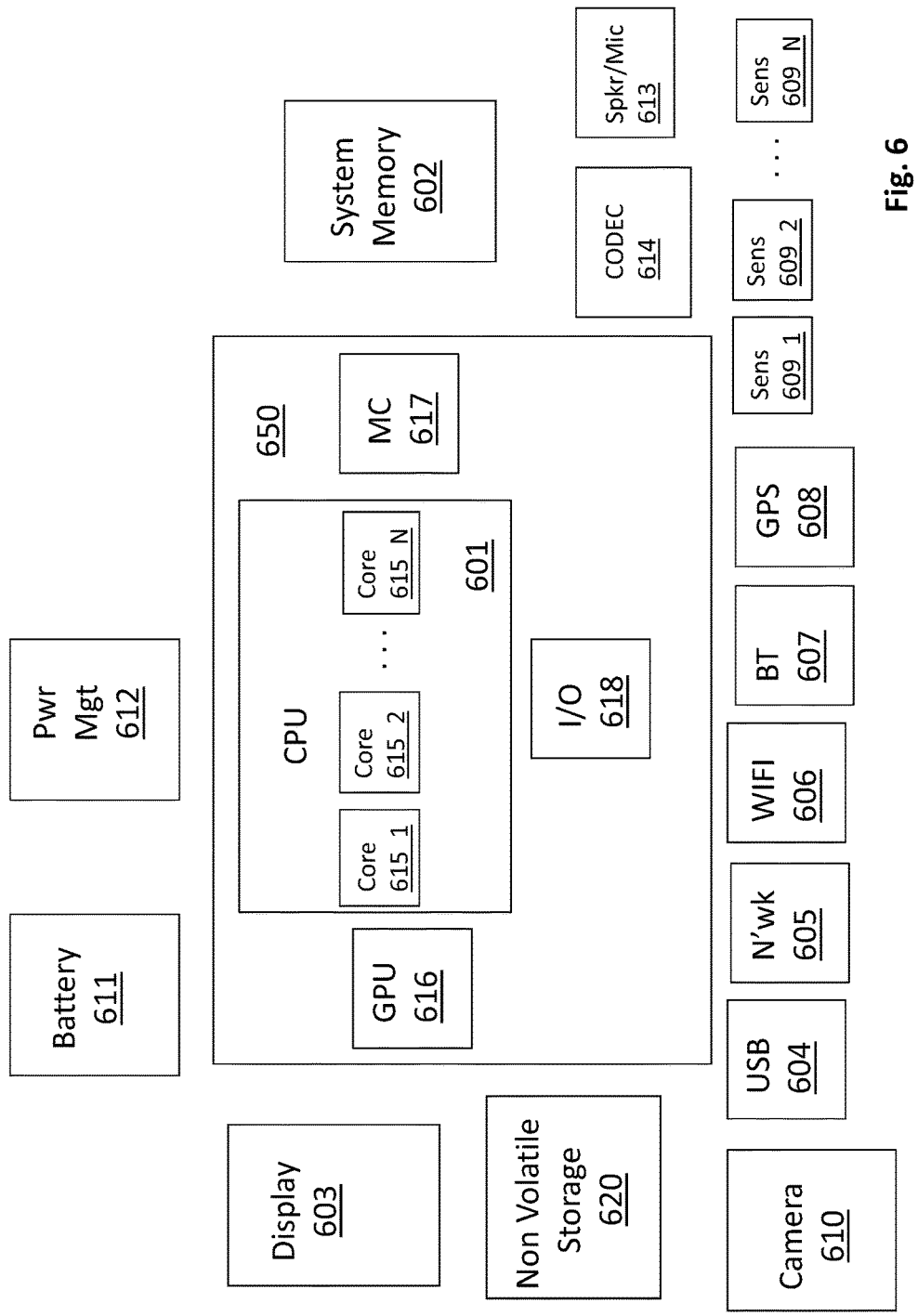
FIG. 6 shows an embodiment of a computing system.

FIG. 6 shows a depiction of an exemplary computing system 600 such as a personal computing system (e.g., desktop or laptop) or a mobile or handheld computing system such as a tablet device or smartphone. As observed in FIG. 6, the basic computing system may include a central processing unit 601 (which may include, e.g., a plurality of general purpose processing cores and a main memory controller disposed on an applications processor or multi-core processor), system memory 602, a display 603 (e.g., touchscreen, flat-panel), a local wired point-to-point link (e.g., USB) interface 04, various network I/O functions 605 (such as an Ethernet interface and/or cellular modem subsystem), a wireless local area network (e.g., WiFi) interface 606, a wireless point-to-point link (e.g., Bluetooth) interface 607 and a Global Positioning System interface 608, various sensors 609_1 through 609_N (e.g., one or more of a gyroscope, an accelerometer, a magnetometer, a temperature sensor, a pressure sensor, a humidity sensor, etc.), a camera 610, a battery 611, a power management control unit 612, a speaker and microphone 613 and an audio coder/decoder 614. The display 603 may be an LED display that is driven by an LED driver circuit as described herein.

An applications processor or multi-core processor 650 may include one or more general purpose processing cores 615 within its CPU 601, one or more graphical processing units 616, a memory management function 617 (e.g., a memory controller) and an I/O control function 618. The general purpose processing cores 615 typically execute the operating system and application software of the computing system. The graphics processing units 616 typically execute graphics intensive functions to, e.g., generate graphics information that is presented on the display 603. The memory control function 617 interfaces with the system memory 602. The system memory 602 may be a multi-level system memory. During operation, data and/or instructions are typically transferred between a lowest level non volatile (e.g., "disk") storage 620 and system memory 602. The power management control unit 612 generally controls the power consumption of the system 600.

Each of the touchscreen display 603, the communication interfaces 604-607, the GPS interface 608, the sensors 609, the camera 610, and the speaker/microphone codec 613, 614 all can be viewed as various forms of I/O (input and/or output) relative to the overall computing system including, where appropriate, an integrated peripheral device as well (e.g., the camera 610). Depending on implementation, various ones of these I/O components may be integrated on the applications processor/multi-core processor 650 or may be located off the die or outside the package of the applications processor/multi-core processor 650.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions.

For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:
   limiting power consumption of a power supply's load circuitry by performing the following:
     receiving an indication of the load circuitry's activity;
     in response to the indication, generating a first signal that describes the activity and a second signal that describes whether the activity is initiating or completing;
     determining a weight amount from the first signal and adjusting a credit count by the weight amount up or down based on whether the second signal indicates the activity is initiating or completing, the credit count indicating an amount of additional power that the power supply is able to deliver;
     comparing the credit count against a first threshold, the first threshold to represent the power supply exceeding its maximum allowed instaneous power delivery;
     calculating an average credit count that accounts for the credit count and previous credit counts and comparing the average credit count against a second threshold, the second threshold to represent the power supply exceeding its maximum allowed average power delivery, the calculating of the average credit count averaging over a window size, the window size being tuned to the power supply's ability to operate near the maximum allowed instaneous power delivery; and,
     adjusting an activity level of the load circuitry if either threshold is crossed, wherein, based on the tuned window size, if the power supply is able to operate near the maximum allowed instaneous power for a longer period of time the second threshold will be crossed later in time than if the power supply is able to operate near the maximum allowed instaneous power for a shorter period of time.

2. The method of claim 1 wherein the method is performed on a dual in-line memory module (DIMM) card.

3. The method of claim 2 wherein the load circuitry includes memory devices.

4. The method of claim 3 wherein the memory devices include three dimensional crosspoint memory devices.

5. The method of claim 4 wherein the memory devices also include dynamic random access memory (DRAM) memory devices.

6. The method of claim 1 wherein other possible weights are selected from a group consisting of:
   a read weight;
   a write weight;
   a memory bus transaction weight.

7. An apparatus, comprising:
   circuitry to limiting power consumption of a power supply's load circuitry comprising:
     a first circuit having an input to receive an indication of an activity of a load circuit of a power supply and outputs to provide, in response to the indication, a first signal that describes the activity and a second signal that describes whether the activity is initiating or completing;
     a multiplexer to select a weight amount based on the first signal;
     a credit count circuit to adjust a credit count by the weight amount up or down based on whether the second signal indicates the activity is initiating or completing, the credit count indicating an amount of additional power that the power supply is able to deliver;
     a first comparator to compare the credit count against a first threshold, the first threshold to represent the power supply exceeding its maximum allowed instaneous power delivery;
     an average credit count circuit to calculate an average of the credit count and previous credit counts, the average credit count circuit to average over a window size, the window size being tuneable to the power supply's ability to operate near the maximum allowed instaneous power delivery;
     a second comparator to compare the average credit count against a second threshold, the second threshold to represent the power supply exceeding its maximum allowed average power delivery; and
     a second circuit to generate a throttle signal if either threshold is crossed, the load circuitry coupled downstream from the second circuit, the load circuiry to reduce its activity level in response to the throttle signal such that, based on the tuned window size, if the power supply is able to operate near the maximum allowed instaneous power for a longer period of time the second comparator will trip later in time than if the power supply is able to operate near the maximum allowed instaneous power for a shorter period of time.

8. The apparatus of claim 7 wherein the credit count circuit includes a programmable register to store a programmed credit count amount.

9. The apparatus of claim 7 wherein the first circuit, the multiplexer, the credit count circuit, the first and second comparators, the average credit count circuit and the circuit to generate the throttle signal are disposed on a DIMM card.

10. The apparatus of claim 9 wherein the DIMM card includes three dimensional cross point memory devices.

11. The apparatus of claim 10 wherein the three dimensional cross point memory devices are non volatile memory devices.

12. The apparatus of claim 10 wherein the DIMM card also includes DRAM memory devices.

13. The apparatus of claim 9 wherein the second circuit to generate a throttle signal is coupled to a scheduler that schedules activities for the DIMM card.

14. The apparatus of claim 7 wherein the second circuit to generate a throttle signal is coupled to any of:
   a circuit to issue instructions to be executed;
   a circuit to send traffic into a network;
   a circuit to trigger an application specific circuit into action.

15. A computing system, comprising:
   a DIMM card comprising circuitry to limit power consumption of the DIMM card comprising:
     a first circuit having an input to receive an indication of an activity of a load circuit of a power supply and outputs to provide, in response to the indication, a first signal that describes the activity and a second signal that describes whether the activity is initiating or completing;

a multiplexer to select a weight amount based on the first signal;

a credit count circuit to adjust a credit count by the weight amount up or down based on whether the second signal indicates the activity is initiating or completing, the credit count indicating an amount of additional power that the power supply is able to deliver;

a first comparator to compare the credit count against a first threshold, the first threshold to represent the power supply exceeding its maximum allowed instaneous power delivery;

an average credit count circuit to calculate an average of the credit count and previous credit counts, the average credit count circuit to average over a window size, the window size being tuneable to the power supply's ability to operate near the maximum allowed instaneous power delivery;

a second comparator to compare the average credit count against a second threshold, the second threshold to represent the power supply exceeding its maximum allowed average power delivery; and a second circuit to generate a throttle signal if either threshold is crossed, the load circuitry coupled downstream from the second circuit, the load circuiry to reduce its activity level in response to the throttle signal such that, based on the tuned window size, if the power supply is able to operate near the maximum allowed instaneous power for a longer period of time the second comparator will trip later in time than if the power supply is able to operate near the maximum allowed instaneous power for a shorter period of time.

16. The computing system of claim 15 wherein the DIMM card is part of a multi-level system memory.

17. The computing system of claim 15 wherein the DIMM card includes three dimensional cross point memory devices.

18. The computing system of claim 17 wherein the three dimensional cross point memory devices are non volatile memory devices.

19. The computing system of claim 17 wherein the DIMM card also includes DRAM memory devices.

20. The computing system of claim 17 wherein the second circuit to generate a throttle signal is coupled to a scheduler that schedules activities for the memory devices.

* * * * *